United States Patent
Choi et al.

(10) Patent No.: US 10,845,593 B2
(45) Date of Patent: Nov. 24, 2020

(54) DISPLAY DEVICE FOR DISPLAYING VIRTUAL IMAGES

(71) Applicant: SAMSUNG ELECTRONICS CO., LTD., Suwon-si (KR)

(72) Inventors: Kyuhwan Choi, Yongin-si (KR); Dong Kyung Nam, Yongin-si (KR); Yoonsun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 15/980,289

(22) Filed: May 15, 2018

(65) Prior Publication Data

US 2019/0094537 A1    Mar. 28, 2019

(30) Foreign Application Priority Data

Sep. 25, 2017 (KR) ............ 10-2017-0123457

(51) Int. Cl.
*G03H 1/00* (2006.01)
*G02B 27/01* (2006.01)
(Continued)

(52) U.S. Cl.
CPC .......... *G02B 27/0103* (2013.01); *B60K 35/00* (2013.01); *G02B 27/4205* (2013.01);
(Continued)

(58) Field of Classification Search
CPC .............. G02B 5/18; G02B 2005/1804; G02B 5/1814; G02B 5/1819; G02B 5/1842; G02B 5/1866; G02B 5/32; G02B 27/42; G02B 27/4205; G02B 27/44; G02B 27/01; G02B 27/0101; G02B 27/0103; G02B 2027/0105; G02B 2027/0107; G02B 2027/0109; G02B 2027/0127; G02B 2027/013; G02B 27/017; G02B 27/0172; G02B 27/0174; G02B 2027/0185; G02B 2027/0196; G03H 1/00; G03H 1/0005; G03H 2001/0055; G03H 1/0252; G03H 1/0272; G03H 1/22; G03H 2001/2226; G03H 2001/2234; G03H 1/30; G03H 2223/17; G03H 2223/23; G03H 2250/00; G03H 2270/00; G03H 2270/20; G03H 2270/21
USPC ........ 359/1, 3, 8, 13, 14, 15, 19, 22, 25, 32, 359/35, 558, 566, 569, 570, 574, 575, 359/576
See application file for complete search history.

(56) References Cited

U.S. PATENT DOCUMENTS 4,790,613 A * 12/1988 Moss ............... G03H 1/2286
340/461
6,906,836 B2    6/2005 Parker et al.
(Continued)

FOREIGN PATENT DOCUMENTS

CN    203688913 U    7/2014
JP    0555120 U    7/1993
(Continued)

*Primary Examiner* — Arnel C Lavarias
(74) *Attorney, Agent, or Firm* — Sughrue Mion, PLLC

(57) ABSTRACT

A display device is provided. The display device includes a plurality of diffractive optical elements each configured to emit light guided in a light guide plate to a user. Virtual images by the light are observed by the user at two or more different depths according to the plurality diffractive elements.

22 Claims, 6 Drawing Sheets

(51) Int. Cl.
G02B 27/42 (2006.01)
B60K 35/00 (2006.01)

(52) U.S. Cl.
CPC .. *B60K 2370/1531* (2019.05); *B60K 2370/29* (2019.05); *B60K 2370/334* (2019.05); *B60K 2370/77* (2019.05); *B60K 2370/785* (2019.05); *G02B 2027/0127* (2013.01); *G02B 2027/0185* (2013.01)

(56) References Cited

U.S. PATENT DOCUMENTS

| | | | |
|---|---|---|---|
| 7,502,153 B2 * | 3/2009 | Shimizu | G02B 27/0103 359/13 |
| 2017/0160548 A1 | 6/2017 | Woltman et al. | |

FOREIGN PATENT DOCUMENTS

| | | |
|---|---|---|
| JP | 05165391 A | 7/1993 |
| JP | 3477760 B2 | 12/2003 |
| JP | 2011510341 A | 3/2011 |
| JP | 2014026244 A | 2/2014 |
| KR | 100820898 B1 | 4/2008 |
| KR | 1020150136601 A | 12/2015 |

\* cited by examiner

DISPLAY DEVICE FOR DISPLAYING VIRTUAL IMAGES

CROSS-REFERENCE TO RELATED APPLICATION

This application is based on and claims priority under 35 U.S.C. § 119 to Korean Patent Application No. 10-2017-0123457, filed on Sep. 25, 2017 in the Korean Intellectual Property Office, the disclosure of which is incorporated by reference herein in its entirety.

BACKGROUND

1. Field

Methods and apparatuses consistent with embodiments relate to a display device.

2. Description of the Related Art

Augmented reality (AR) representing a variety of visual information to assist in driving a vehicle and other transportation devices is provided through a navigation or a display provided to the vehicle. For example, in related art, there have been attempts to match a virtual image with actual driving information or to display the virtual image at a static location through an AR-based head-up display (HUD) device.

SUMMARY

Embodiments of the disclosure may address at least the above problems and/or disadvantages and other disadvantages not described above. Also, the embodiments of the disclosure are not required to overcome the disadvantages described above, and an embodiment may not overcome any of the problems described above.

In accordance with an aspect of the disclosure, there is provided a display device comprising: a plurality of diffractive optical elements each configured to emit light guided in a light guide plate to a user, wherein a first diffractive optical element, among the plurality of diffractive optical elements, is configured to form a first virtual image based on the light, to be observed at a first depth from a user, wherein a second diffractive optical element, among the plurality of diffractive optical elements, is configured to form a second virtual image by the light, to be observed at a second depth from the user, and wherein the first depth is different from the second depth.

The plurality of diffractive optical elements may be provided to be adjacent to each other in a vertical direction of the light guide plate.

The width of each of the plurality of diffractive optical elements is longer than the height of each of the plurality of diffractive optical elements.

Each of the plurality of diffractive optical elements may comprise an interference pattern according to a holographic scheme, and the light guided in the light guide plate may be provided from a light source configured to generate a reference beam according to the holographic scheme.

The display device may further comprise: a plurality of display engines each comprising a light source configured to generate the light and a display panel configured to receive the light from the light source; and the light guide plate configured to internally guide the light emitted from the display panel included in each of the plurality of display engines.

The plurality of display engines may be provided to be adjacent to each other in a vertical direction relative to a side of the light guide plate.

Each of the plurality of display engines may further comprise a prism configured to allow light emitted from a corresponding display panel to be incident to the inside of the light guide plate.

The light guide plate may comprise an internal shield configured to prevent the light transferred from the plurality of display engines from being mixed in the light guide plate.

The display panel included in each of the plurality of display engines may be configured to display a partial image segmented from a single image or to display a different image.

Each of the plurality of diffractive optical elements may comprise a holographic optical element configured by a laser interference lithography scheme.

The plurality of diffractive optical elements may be provided at a location separated by a distance from a glass included in one of a vehicle, a motorcycle, a smart mobility, an airplane, and a ship, and the light emitted by the plurality of diffractive optical elements may be provided to the glass.

The display device may be a head-up display (HUD).

The light guide plate may comprise a glass included in one of a vehicle, a motorcycle, a smart mobility, an airplane, and a ship.

In accordance with an aspect of the disclosure, there is provided a display device comprising: a plurality of display engines each comprising a light source and a display panel configured to receive light from the light source; a light guide plate configured to internally guide the light emitted from the display panel included in each of the plurality of display engines; and one or more diffractive optical elements configured to be attached to the light guide plate and to emit the light guided in the light guide plate, wherein the plurality of display engines is provided to be adjacent to each other in a vertical direction relative to a side of the light guide plate.

The one or more diffractive optical elements is configured to form a virtual image based on the light, to be observed at a depth from a user, the depth being determined based on one or more diffractive optical elements.

The one or more diffractive optical elements may comprise a plurality of diffractive optical elements provided to be adjacent to each other in a vertical direction of the light guide plate.

The width of each of the plurality of diffractive optical elements may be longer than the height of each of the plurality of diffractive optical elements.

The depth of the virtual image may be controlled by controlling a reference beam provided from the light source included in each of the plurality of display engines.

In accordance with an aspect of the disclosure, there is provided a display device comprising: a light guide plate configured to internally guide a light emitted from one or more display engines; a first diffractive optical element attached to the light guide plate and configured to form a first virtual image based on the light, to be observed at a first depth from a user; and a second diffractive optical element attached to the light guide plate and configured to form a second virtual image based on the light, to be observed at a second depth from the user, wherein the first depth is different from the second depth.

The first and the second diffractive optical elements may be laminated onto the light guide plate to be adjacent to each other in a vertical direction.

BRIEF DESCRIPTION OF THE DRAWINGS

The above and/or other aspects will be more apparent by describing certain embodiments with reference to the accompanying drawings, in which.

DETAILED DESCRIPTION

Figure 1:
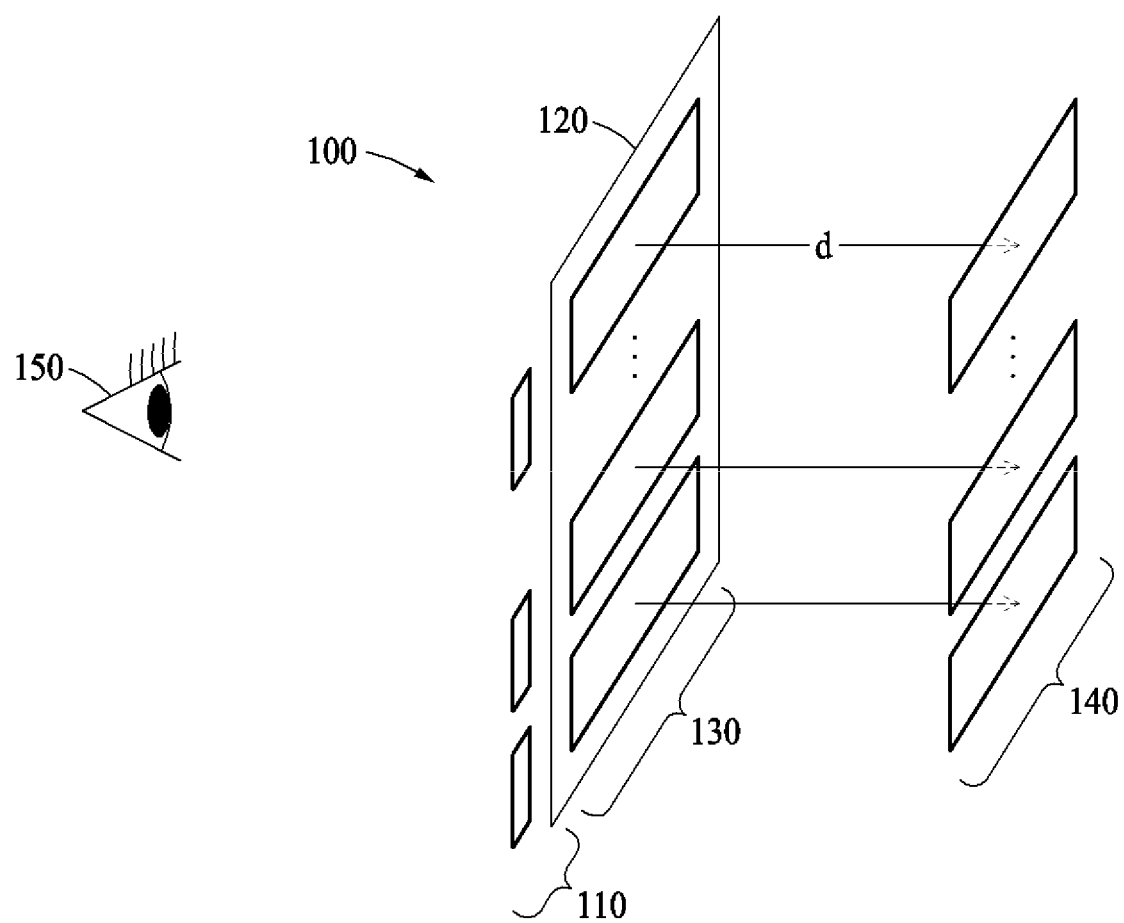
FIG. 1 illustrates an overall operation of a display device according to an embodiment.

Reference will now be made in detail to embodiments, examples of which are illustrated in the accompanying drawings, wherein like reference numerals refer to the like elements throughout. Embodiments of the disclosure are described below in order to explain the present disclosure by referring to the figures.

The following detailed structural or functional description of embodiments is provided as an example only and various alterations and modifications may be made to the embodiments. Accordingly, the embodiments are not construed as being limited to the disclosure and should be understood to include all changes, equivalents, and replacements within the technical scope of the disclosure.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises/includes" and/or "comprising/including," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, embodiments of the disclosure will be described with reference to the accompanying drawings. The following structural or functional descriptions are provided to merely describe the embodiments, and the scope of the embodiments is not limited to the descriptions provided in the present specification. Various changes and modifications may be made thereto by one of ordinary skill in the art. Regarding the reference numerals assigned to the elements in the drawings, it should be noted that the same elements will be designated by the same reference numerals, wherever possible, even though they are shown in different drawings. Also, a known function and structure are omitted.

FIG. 1 illustrates an overall operation of a display device 100 according to an embodiment.

Referring to FIG. 1, the display device 100 may include a plurality of display engines 110, a light guide plate 120, and a plurality of diffractive optical elements (DOEs) 130.

The display device 100 may be, for example, a head-up display (HUD), and a user 150 may observe virtual images 140 through the display device 100. For example, the display device 100 may be applied to a two-dimensional (2D) display or a three-dimensional (3D) display as an augmented reality (AR) based HUD.

The plurality of display engines 110 is provided to be adjacent to each other in a vertical direction relative to a side of the light guide plate 120. Each of the plurality of display engines 110 may include a light source, a display panel, and a prism. The plurality of display engines 110 may correspond to the plurality of DOEs 130, respectively. Each of the plurality of display engines 110 may generate light for a corresponding DOE 130 and may provide the light to the light guide plate 120.

The light guide plate 120 internally guides the light emitted from each of the plurality of display engines 110. The light incident to the light guide plate 120 may be guided in the light guide plate 120 based on a total reflection condition. According to an embodiment, the light guide plate 120 may include an internal shield configured to prevent the light transferred from the respective plurality of display engines from being mixed in the light guide plate.

For example, the light guide plate 120 may correspond to a glass, for example, a windshield and a combiner, included in, for example, a vehicle, a motorcycle, a smart mobility, an airplane, and a ship. The light guide plate 120 may also be referred to as a waveguide.

Each of the plurality of DOEs 130 is attached to the light guide plate 120 and emits the light guided in the light guide plate 120. The light emitted from the light guide plate 120 based on a predesigned diffraction condition of the DOEs 130 may be transferred to the user 150, such that the user 150 may view the virtual images 140.

The virtual images 140 are images displayed on an HUD, and may correspond to images displayed on display panels of the respective display engines 110. For example, the virtual images 140 may be formed at a location separate from the light guide plate 120 by a desired distance d. For clarity of description, referring to FIG. 1, the virtual images 140 are formed at the same distance. However, it is provided as an example only and according to another embodiment, the virtual images 140 may be formed at two or more different distances. Here, a distance at which the virtual image 140 is formed may also be referred to as a depth of the virtual image 140.

For example, the user 150 may be an entity that drives a vehicle, a motorcycle, a smart mobility, an airplane, and a ship, or an entity that wears an HUD device.

Through the display device 100, it is possible to prevent an image distortion from occurring due to a 3D optical system while maintaining a unique resolution of a display panel.

Figure 2:
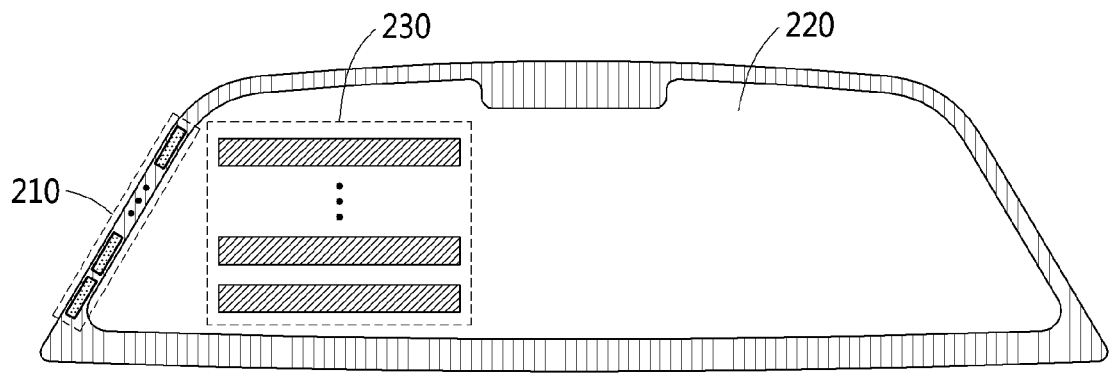
FIG. 2 is a front view of a display device according to an embodiment.

FIG. 2 is a front view of a display device according to an embodiment.

Referring to FIG. 2, the display device may include a plurality of display engines 210, a light guide plate 220, and a plurality of DOEs 230. Herein, the display device may be applied to a windshield of a vehicle.

The plurality of display engines 210 may be positioned on an A pillar of the vehicle and may be continuously provided in a vertical direction relative to a side of the light guide plate 220. Each of the plurality of display engines 210 may generate light and may provide the light to the light guide plate 220.

The light guide plate 220 may internally guide the light provided from the plurality of display engines 210.

Each of the plurality of DOEs 230 may be provided to the light guide plate 220 and may emit the light guided in the light guide plate 220 to a user. The plurality of DOEs 230 may be attached to the light guide plate 220 to be adjacent to each other in a vertical direction of the light guide plate 220. For example, the plurality of DOEs 230 may be provided to the light guide plate 220 through lamination processing. Referring to FIG. 2, each of the plurality of DOEs 230 may have a width greater than a height.

By continuously providing the plurality of DOEs 230 each having a width greater than a height in the vertical direction of the light guide plate 220, it is possible to effectively remove an image distortion by an HUD.

For clarity of description, FIG. 2 illustrates an example in which the display device is applied to a windshield of a vehicle. However, it is provided as an example only and according to another embodiment, the display device may be applied to be any device to which the HUD is applicable.

Figure 3:
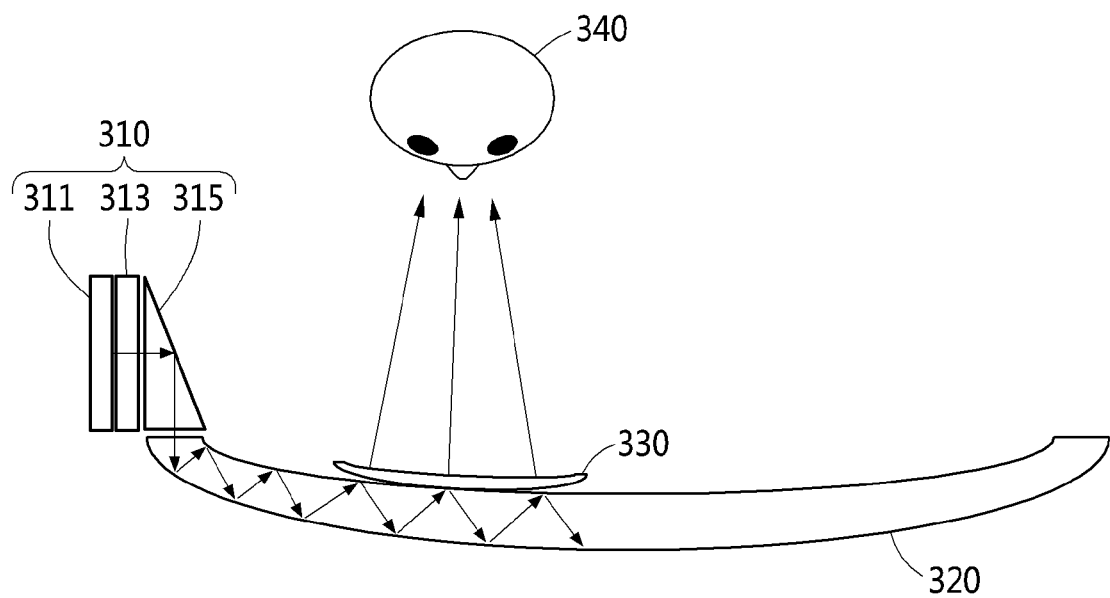
FIG. 3 is a top view of a display device according to an embodiment.

FIG. 3 is a top view of a display device according to an embodiment.

Referring to FIG. 3, the display device may include a display engine 310, a light guide plate 320, and a DOE 330. Herein, FIG. 3 illustrates a single display engine 310 and a single DOE 330 corresponding thereto.

The display engine 310 may include a light source 311, a display panel 313, and a prism 315. The light source 311 may generate light and may provide the light to the display panel 313. For example, the light source 311 may include a light emitting diode (LED) and a laser.

The display panel 313 may output an image desired to be displayed using the display device. For example, the display panel 313 may display navigation information or information acquired from on-board diagnostics (OBD) 2 of a vehicle. The display panel 313 may include a liquid crystal display (LCD), a digital light processing (DLP), a liquid crystal on silicon (LCOS), and a spatial light modulator (SLM), each having a 2D imaging surface. According to an embodiment, the display panel 313 included in each of the plurality of display engines may be configured to display a partial image segmented from a single image or configured to display a different image.

The prism 315 may be in a structural body configured to change an optical path of light that is generated at the light source 311 and that passes through the display panel 313 and to allow the light to be incident to an inside of the light guide path 320. That is, the prism 315 may allow the light emitted from the display panel 313 to be incident to the inside of the light guide plate 320.

The light guide plate 320 may internally guide the light incident through the prism 315 based on a total reflection condition. Once the light guided in the light guide plate 320 meets the DOE 330, the total reflection condition may be broken by the DOE 330 and the light may be emitted outward from the light guide plate 320. Here, due to a diffraction condition of the DOE 330, the light emitted from the light guide plate 320 may be incident to both eyes of a user 340. The user 340 may view an image displayed on the display panel 313 as a virtual image.

If the DOE 330 has a diffraction function and a magnification function, such as a lens, the DOE 330 may provide a wide field of view to the user 340.

Figure 4:
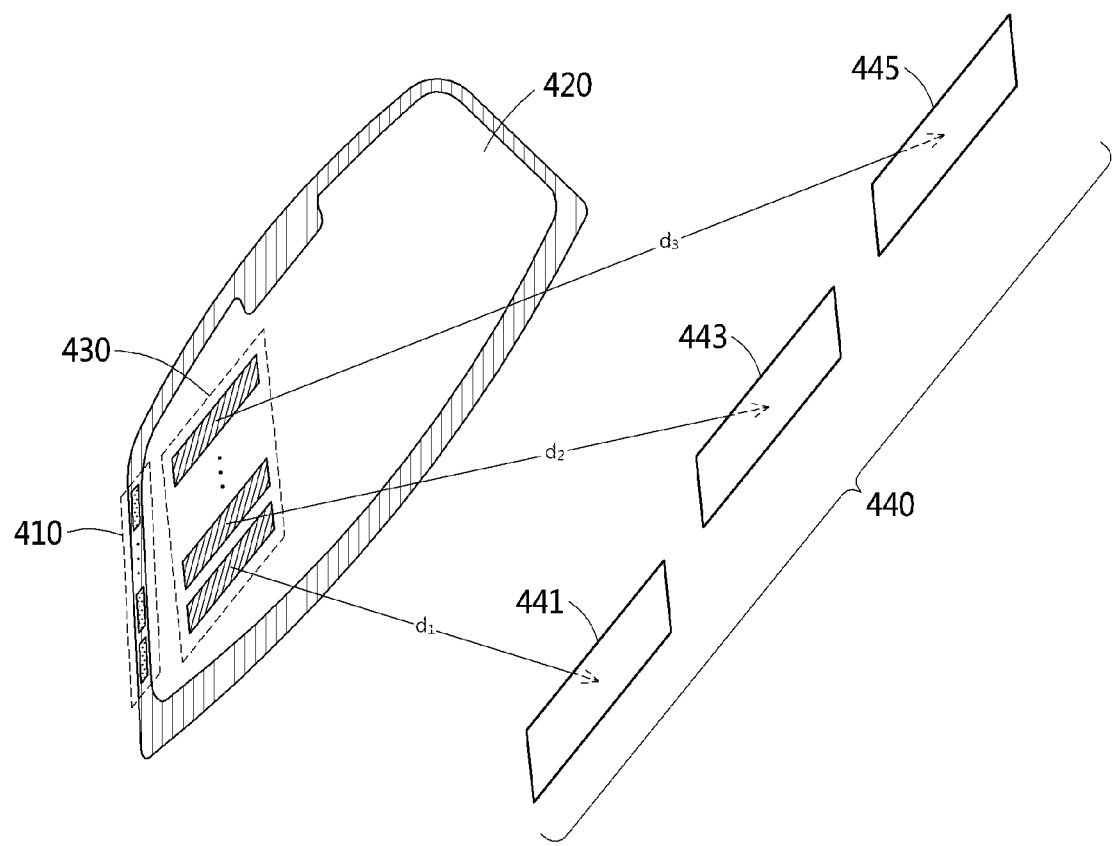
FIG. 4 is a perspective view of a display device to describe a depth of a virtual image according to an embodiment.

FIG. 4 is a perspective view of a display device to describe a depth of a virtual image according to an embodiment.

Referring to FIG. 4, the display device may include a plurality of display engines 410, a light guide plate 420, and a plurality of DOEs 430.

Virtual images 440 may be observed by a user at a location separate at a desired depth from the light guide plate 420. As described above with FIG. 1, the virtual images 440 may be observed by the user at the same depth. Alternatively, referring to FIG. 4, the virtual images 440 may be observed at different depths $d_1$, $d_2$, and $d_3$.

According to the embodiment in FIG. 4, a first virtual image 441 may be observed at the depth $d_1$, a second virtual image 443 may be observed at the depth $d_2$, and the third virtual image 445 may be observed at a depth $d_3$. Here, $d_1 < d_2 < d_3$.

Hereinafter, an example in which the virtual images 440 display navigation information is described with reference to FIG. 4. If a vehicle being driven is at a location that is 100 m from a point at which the vehicle is to make a right turn, a right turn indication may be displayed using the third virtual image 445. If the vehicle being driven is at a location that is 50 m from the point at which the vehicle is to make the right turn, the right turn indication may be displayed using the second virtual image 443. If the vehicle being driven is at a location 5 m from the point at which the vehicle is to make the right turn, the right turn indication may be displayed using the first virtual image 441. As described above, since navigation information and an actual road are matched and thereby displayed using the virtual images 440, a user may simultaneously verify the actual road and the navigation information.

As another example, information associated with a neighboring situation of a vehicle being driven may be provided, that is, displayed to the user using the virtual images 440. Information associated with an object, for example, a building, which is high and positioned at a far distance may be displayed using the third virtual image 445 and information associated with a road on which the vehicle is being driven may be displayed using the first virtual image 441.

As another example, information that is to be transferred to the user may be displayed at a different depth based on a speed of the vehicle. Information at a high speed may be displayed using the third virtual image 445, information at an intermediate speed may be displayed using the second virtual image 443, and information at a low speed may be displayed using the first virtual image 441.

As described above, the virtual images 440 may be observed by the user at a specific depth. The depth of the virtual images 440 may be determined by the plurality of DOEs 430, or may be determined by a light source included in each of the plurality of display engines 410.

For example, the plurality of DOEs 430 may be designed at a corresponding depth, which will be further described with reference to FIGS. 5 and 6.

Also, the depth of the virtual image 440 may be controlled by controlling a reference beam provided from the light source included in each of the plurality of display engines 410. For example, the depth of the virtual image 440 by the corresponding DOE 430 may be dynamically controlled by changing a property, for example, intensity and phase, of the reference beam provided from the light source. Through this, the virtual images 440 displayed at different depths in response to a user manipulation during driving of the vehicle may be displayed at the same depth. On the contrary, the virtual images 440 may be displayed at different depths.

Figure 5:
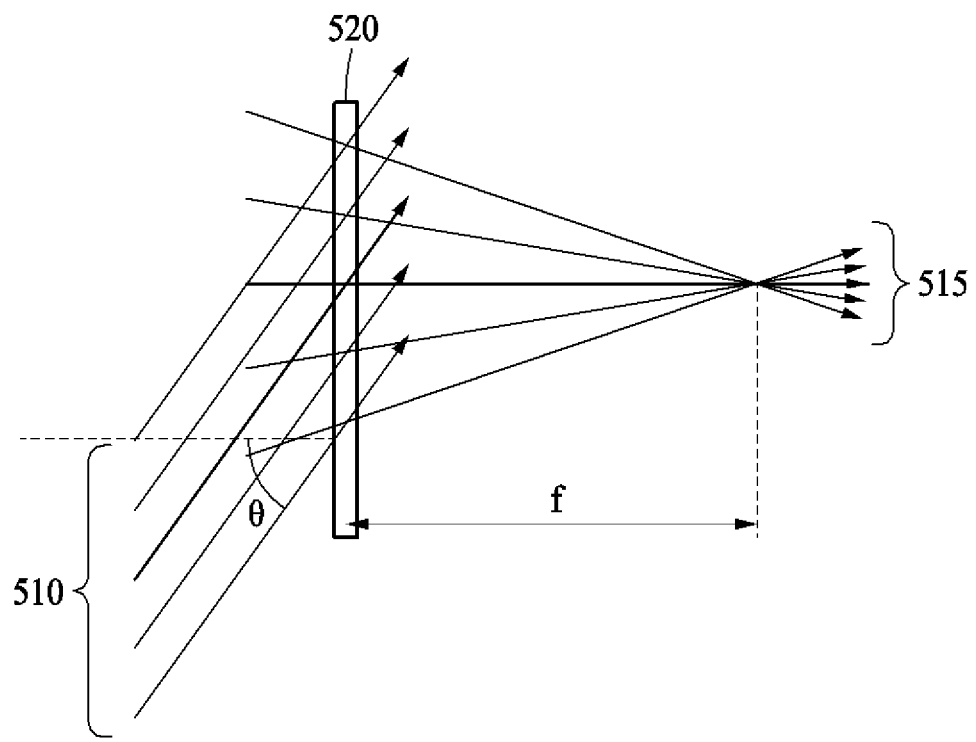
FIGS. 5 and 6 illustrate a diffractive optical element according to an embodiment.
Figure 6:
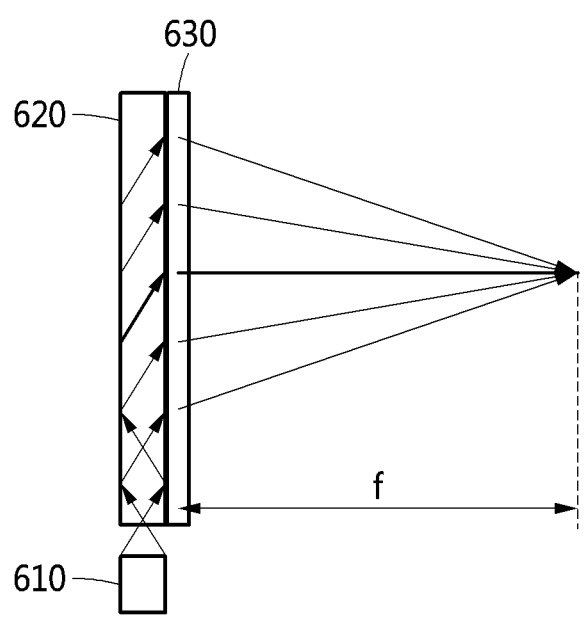

FIGS. 5 and 6 illustrate an example of describing a diffractive optical element according to an embodiment.

An example of recording an interference pattern on a DOE 520 according to an embodiment is described with reference to FIG. 5.

The DOE 520, as a holographic optical element (HOE) that is manufactured using a laser interference lithography scheme, may also be referred to as a recording medium. A reference beam 510 may be incident to the DOE 520 at a constant incidence angle θ and an object beam 515 may be incident to the DOE 520 as scattering light. The incidence angle θ of the reference beam 510 may be 43 degrees to 89 degrees greater than a total reflection angle of a glass. A focal distance f of the object beam 515 is used to determine a field of view (FOV) of a HUD system. Thus, there is a need to decrease the focal distance or to fix the focal distance and to increase a scattering angle of the object beam 515 to achieve a wide field of view.

Due to constructive interference and destructive interference of the two laser beams, that is, the reference beam 510 and the object beam 515, an interference pattern may be generated on the DOE 520 and the DOE 520 may record the interference pattern. The DOE 520 used as the recording medium may be photopolymer, photoresist, and the like. Here, a laser may be used as the light source and a wavelength may be red, green, blue (RBG).

An operation of a DOE 630 that records an interference pattern according to an example is described with reference to FIG. 6.

Referring to FIG. 6, the DOE 630 may be attached to a light guide plate 620. Once light emitted from a display engine 610 is incident to the light guide plate 620, the light may be guided in the light guide plate 620 and diffracted to an outside by the DOE 630. Here, the light may be diffracted only when the light is at the same angle as an incidence angle θ of the DOE 630 and may be transferred to both eyes of a user. Through this, the user may observe a virtual image of an object at the same location as the focal distance f of FIG. 5.

Figure 7:
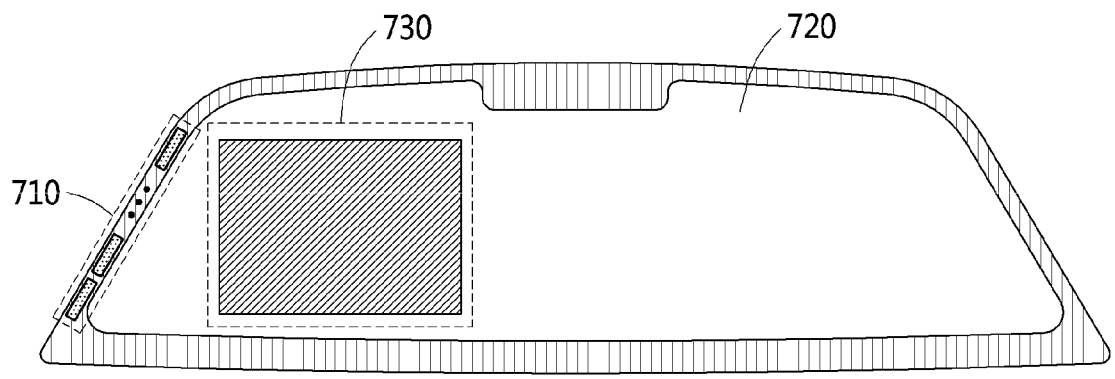
FIG. 7 is a front view of a display device according to another embodiment.

FIG. 7 is a front view of a display device according to another embodiment.

Referring to FIG. 7, the display device may include a plurality of display engines 710, a light guide plate 720, and a DOE 730.

Dissimilar to the aforementioned embodiment, the display device may include a single DOE 730. Light emitted from a display panel included in each of the plurality of display engines 710 may be guided in the light guide plate 720, emitted from the light guide plate 720 by the DOE 730, and transferred to a user. Here, since a single DOE 730 is configured, virtual images by the DOE 730 may be observed by the user at the same depth.

Figure 8:
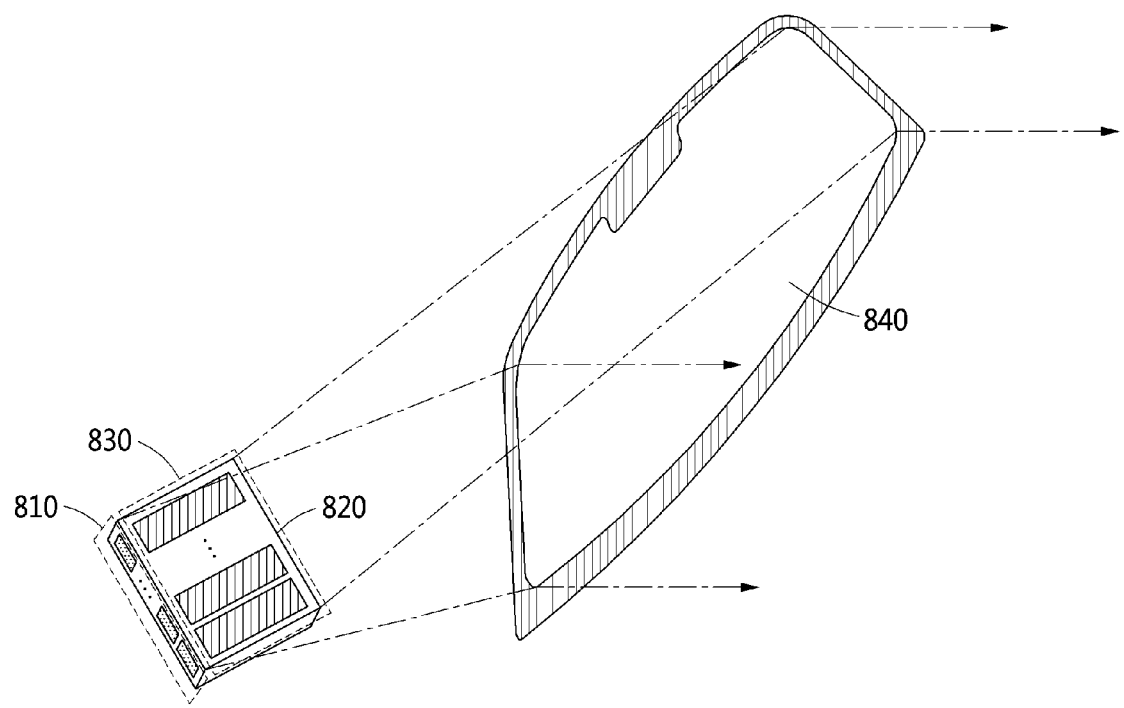
FIG. 8 illustrates a display device according to another embodiment.

FIG. 8 illustrates a display device according to another embodiment.

Referring to FIG. 8, the display device may include a plurality of display engines 810, a light guide plate 820, a plurality of DOEs 830, and an additional optical element 840.

Dissimilar to the aforementioned embodiments, the light guide plate 820 may be provided in a vehicle. An optical path of light emitted from the light guide plate 820 by the plurality of DOEs 830 may be changed by the additional optical element 840 and thereby provided to a user. For example, the additional optical element 840 may be provided to a windshield of the vehicle as a half-mirror, a beam splitter, and the like, capable of changing the optical path.

An area of the light guide plate 820 may be less than that of the windshield of the vehicle. In this case, a magnification lens may be additionally provided between the plurality of DOEs 830 and the additional optical element 840.

Figure 9:
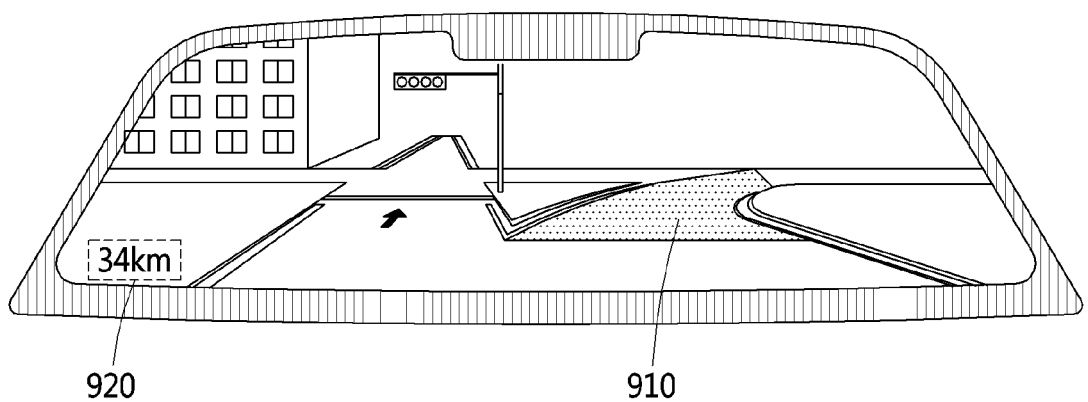
FIG. 9 illustrates an example of a virtual image observed through a display device according to an embodiment.

FIG. 9 illustrates an example of a virtual image observed through a display device according to an embodiment.

FIG. 9 illustrates an example of a virtual image displayed through the display device.

Referring to FIG. 9, navigation information may be displayed using a first virtual image 910. The navigation information may be mapped to an actual road and a user may simultaneously verify the navigation information and the actual road without having a sense of difference.

Driving information, for example, a driving speed, of a vehicle may be displayed using a second virtual image 920. Although not illustrated in FIG. 9, information associated with a building provided at front may be displayed using a virtual image that is displayed on the display device. Also, information useful to the user that drives the vehicle may be displayed using a virtual image without being limited.

The embodiments described herein may be implemented using hardware components, software components, and/or combination thereof. For example, the display engines described herein may be implemented using hardware components, software components, and/or combination thereof. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

The foregoing embodiments are examples and are not to be construed as limiting. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A display device comprising:
a plurality of display engines each comprising a light source configured to generate light and a display panel configured to receive the light from the light source;
a light guide plate configured to internally guide the light emitted from the display panel included in each of the plurality of display engines; and
a plurality of diffractive optical elements each configured to emit light guided in the light guide plate,
wherein a first diffractive optical element, among the plurality of diffractive optical elements, is configured to form a first virtual image based on the light, to be observed at a first depth from a user,
wherein a second diffractive optical element, among the plurality of diffractive optical elements, is configured to form a second virtual image by the light, to be observed at a second depth from the user,
wherein the first depth is different from the second depth, and
wherein the first diffractive optical element and the second diffractive optical element are arranged in a non-overlapping manner.

2. The display device of claim 1, wherein the plurality of diffractive optical elements are provided to be adjacent to each other in a vertical direction of the light guide plate.

3. The display device of claim 1, wherein a width of each of the plurality of diffractive optical elements is longer than a height of each of the plurality of diffractive optical elements.

4. The display device of claim 1, wherein each of the plurality of diffractive optical elements comprises an interference pattern according to a holographic scheme, and
the light guided in the light guide plate is provided from a light source configured to generate a reference beam according to the holographic scheme.

5. A display device comprising:
a plurality of diffractive optical elements each configured to emit light guided in a light guide plate;
a plurality of display engines each comprising a light source configured to generate the light and a display panel configured to receive the light from the light source; and
the light guide plate configured to internally guide the light emitted from the display panel included in each of the plurality of display engines,
wherein a first diffractive optical element, among the plurality of diffractive optical elements, is configured to form a first virtual image based on the light, to be observed at a first depth from a user,
wherein a second diffractive optical element, among the plurality of diffractive optical elements, is configured to form a second virtual image by the light, to be observed at a second depth from the user,
wherein the first depth is different from the second depth.

6. The display device of claim 5, wherein the plurality of display engines is provided to be adjacent to each other in a vertical direction relative to a side of the light guide plate.

7. The display device of claim 5, wherein each of the plurality of display engines further comprises a prism configured to allow light emitted from a corresponding display panel to be incident to the inside of the light guide plate.

8. The display device of claim 5, wherein the light guide plate comprises an internal shield configured to prevent the light transferred from the plurality of display engines from being mixed in the light guide plate.

9. The display device of claim 5, wherein the display panel included in each of the plurality of display engines is configured to display a partial image segmented from a single image or to display a different image.

10. The display device of claim 1, wherein each of the plurality of diffractive optical elements comprises a holographic optical element configured by a laser interference lithography scheme.

11. The display device of claim 1, wherein the plurality of diffractive optical elements is provided at a location separated by a distance from a glass included in one of a vehicle, a motorcycle, a smart mobility, an airplane, and a ship, and
the light emitted by the plurality of diffractive optical elements is provided to the glass.

12. The display device of claim 1, wherein the display device is a head-up display (HUD).

13. The display device of claim 1, wherein the light guide plate comprises a glass included in one of a vehicle, a motorcycle, a smart mobility, an airplane, and a ship.

14. A display device comprising:
a plurality of display engines each comprising a light source and a display panel configured to receive light from the light source;
a light guide plate configured to internally guide the light emitted from the display panel included in each of the plurality of display engines; and
one or more diffractive optical elements configured to be attached to the light guide plate and to emit the light guided in the light guide plate,
wherein the plurality of display engines is provided to be adjacent to each other in a vertical direction relative to a side of the light guide plate.

15. The display device of claim 14, wherein the one or more diffractive optical elements is configured to form a virtual image based on the light to be observed at a depth from a user, the depth being determined based on one or more diffractive optical elements.

16. The display device of claim 14, wherein the one or more diffractive optical elements comprising a plurality of diffractive optical elements provided to be adjacent to each other in a vertical direction of the light guide plate.

17. The display device of claim 16, wherein a width of each of the plurality of diffractive optical elements longer than a height of each of the plurality of diffractive optical elements.

18. The display device of claim 15, wherein the depth of the virtual image is controlled by controlling a reference beam provided from the light source included in each of the plurality of display engines.

19. A display device comprising:
a plurality of display engines each comprising a light source configured to generate the light and a display panel configured to receive the light from the light source;
a light guide plate configured to internally guide the light emitted from the display panel included in each of the plurality of display engines;
a first diffractive optical element attached to the light guide plate and configured to form a first virtual image based on the light, to be observed at a first depth from a user; and
a second diffractive optical element attached to the light guide plate and configured to form a second virtual image based on the light, to be observed at a second depth from the user,
wherein the first depth is different from the second depth, and
wherein the first diffractive optical element and the second diffractive optical element are arranged in a non-overlapping manner.

20. The display device according to claim 19, wherein the first and the second diffractive optical elements are laminated onto the light guide plate to be adjacent to each other in a vertical direction.

21. The display device according to claim 1, wherein the first diffractive optical element and the second diffractive optical element are arranged in the non-overlapping manner in a windshield of a vehicle.

22. The display device according to claim 1, wherein the first diffractive optical element and the second diffractive optical element are arranged in the non-overlapping manner in a direction perpendicular to a light exiting surface of the light guide.

* * * * *